(12) United States Patent
Karamete

(10) Patent No.: US 11,604,079 B1
(45) Date of Patent: Mar. 14, 2023

(54) APPARATUS AND METHOD FOR ADAPTIVE MARKOV CHAIN PROCESSING OVER MAP MATCHING OF VEHICLE TRIP GPS DATA

(71) Applicant: Kinetica DB, Inc., San Francisco, CA (US)

(72) Inventor: Bilge Kaan Karamete, Vienna, VA (US)

(73) Assignee: Kinetica DB, Inc., San Francisco, CA (US)

(*) Notice: Subject to any disclaimer, the term of this patent is extended or adjusted under 35 U.S.C. 154(b) by 71 days.

(21) Appl. No.: 17/102,971

(22) Filed: Nov. 24, 2020

Related U.S. Application Data (60) Provisional application No. 62/970,845, filed on Feb. 6, 2020.

(51) Int. Cl.
*G01C 21/00* (2006.01)
*G01C 21/34* (2006.01)
*G01S 19/42* (2010.01)

(52) U.S. Cl.
CPC ..... *G01C 21/3844* (2020.08); *G01C 21/3446* (2013.01); *G01S 19/42* (2013.01)

(58) Field of Classification Search
CPC .. G01C 21/3844; G01C 21/3446; G01S 19/42
USPC ....................................................... 701/410
See application file for complete search history.

(56) References Cited

U.S. PATENT DOCUMENTS

| | | | | |
|---|---|---|---|---|
| 2009/0201149 A1* | 8/2009 | Kaji | ................. | G01C 21/20 340/539.13 |
| 2011/0241935 A1* | 10/2011 | Miocinovic | ............ | G01C 21/30 342/357.31 |
| 2011/0320113 A1* | 12/2011 | Tate, Jr. | ............. | G01C 21/3469 701/431 |
| 2020/0202057 A1* | 6/2020 | Chen | ................. | G06N 20/00 |
| 2020/0208992 A1* | 7/2020 | Fowe | ................. | G01C 21/3811 |
| 2022/0136853 A1* | 5/2022 | Ferencz | ............... | G06V 10/454 701/423 |

OTHER PUBLICATIONS

Online Map-Matching Based on Hidden Markov Model for Real-Time Traffic Sensing Applications, IEEE (Year: 2012).*

* cited by examiner

*Primary Examiner* — Abby Y Lin
*Assistant Examiner* — Hossam M Abd El Latif
(74) *Attorney, Agent, or Firm* — Cooley LLP (57) ABSTRACT

A non-transitory computer readable storage medium has instructions executed by a processor to adaptively increase Markov chain kernel window width while processing global positioning system (gps) samples as a function of the ratio between geodesic distances of a current route to an actual geodesic distance between pairs of gps samples. The total cost of different kernel sequences is found based on an aggregated sum of shortest path runs through graph edges within different kernel sequences. Road weights are modified based on relative distance of prospective snap locations of road segments to the gps points, so that the shortest path runs with respect to all possible snap locations are selected. Selected kernel sequences are presented as a proposed mapped vehicle route.

5 Claims, 9 Drawing Sheets

APPARATUS AND METHOD FOR ADAPTIVE MARKOV CHAIN PROCESSING OVER MAP MATCHING OF VEHICLE TRIP GPS DATA

CROSS-REFERENCE TO RELATED APPLICATION

This application claims priority to U.S. Provisional Patent Application Ser. No. 62/970,845, filed Feb. 6, 2020, the contents of which are incorporated herein by reference.

FIELD OF THE INVENTION

This invention relates generally to Global Positioning System (GPS) data signal processing. More particularly, this invention is directed toward adaptive Markov chain processing over map matching of vehicle trip GPS data.

BACKGROUND OF THE INVENTION

The basic goal of a generic purpose map matching algorithm is to find out the matching road segment(s) to a set of GPS data emitted from a traveling vehicle within some error of accuracy. There are many essential factors affecting GPS accuracy; the government provides the GPS signal in space with a global average user range rate error (URRE) of ≤0.006 m/sec over any 3 second interval, with 95% probability. This measure must be combined with other factors outside the government's control, including satellite geometry, signal blockage, atmospheric conditions, and receiver design features/quality, to calculate a particular receiver's speed accuracy. Even though it is impossible to eliminate these measurement errors, a brute force approach of increasing the GPS sampling frequency is often used to minimize the cumulative errors at the expense of higher data accumulation and processing. The map matching (MM) task is finding the most reasonable route corresponding to a number of GPS data samples under the assumption that the data has some unavoidable level of noise associated with it.

The road networks are generally conceptualized as unstructured topology composed of directed node-edge graphs G {V, E} where every junction is modeled by a node V and each street by a road segment edge E emanating from V as its edges. The number of edges per node could be different and even though the road network graph is usually not modified often, the traffic conditions and loads mutate significantly during the course of daily traffic. Less frequently, new road segments to the graph could be added, deleted or directions changed for restricted access. Therefore, a dynamic data structure for graph topology is required to model the road networks where there can be expanding or shrinking number of edges per node. The cost (impedance) per edge is modeled as either the geodesic distance or as the time it takes between the two end vertices of the edge. If the speed (traffic allowed) is known at the road segment, the cost value can be calculated from the distance divided by the speed and associated with the edge. Various graph solvers make use of this scalar cost field to solve for the most optimal routing such as shortest path single routing (Dijkstra), multiple routing (traveling salesman), backhaul routing, map matching, etc.

The main idea of MM in converging to a reasonable trip path is to minimize the error of propagation from one GPS point to the next while associating them to the supposed road segments. During this process, if an algorithmic error is made in associating a GPS sample to a wrong road segment, its propagation to the next sample point is unavoidable and the entire matching process results in an erroneous route selection. Hence, it is crucial to include a range of GPS samples in a broader sense instead of focusing on single sample points. The human perception is very apt to making more or less the 'correct' routing decisions by looking at a broader section of GPS samples than just a few. In other words, we are good at processing the visual information by looking ahead and corrections are almost instantly made among all possible paths around the sample points. Similarly, the inference mechanism of our minds in matching road segments to the GPS samples is unconsciously computing in a predictive-corrective manner by looking at a range of data to extract the most likely route as the shortest possible one by snapping gps points to the nearest road segments. If these are the criteria of our innate inferencing process, then there are certainly the constraints of finding shortest possible route and nearest road segments. In fact, there are many possibilities emerge when we consider the fuzzy (noise) aspect of the GPS data that the nearest snap location may not be the most 'correct' road segment.

We can certainly find the best answer from the set of possible snap locations but we need to process possible path formations within a window of a number of GPS samples. In other words, we cannot make a prediction for the 'current' location without observing the gps samples up ahead (future GPS point states).

The number of consecutive possibilities between each pair of GPS samples in a corrective manner should also take into account the constraints of the road network, i.e., some segments are only-one-way restricted, and the route cannot include segments jumping off to another segment if there is no graph connections. There are also the constraints of plausibility, i.e., each sample has a timestamp (breadcrumbs) and the trip sequencing should obey this ascending order for coherence. Moreover, there could be speed limits imposed over certain road segments and the trip path should not contradict the distance traveled, calculated between the speed limit and the timestamps of the GPS samples under the assumption that the vehicle actually obeys the traffic laws and regulations which is a reasonable assumption to make. In light of these observations, a number of criteria for deducing the most likely route from the gps samples can be stated as follows:

Each gps point should be snapping to one of its nearest road segments.
The route should result in shortest paths among snapped locations calculated based on the weights (time or distance) of the road segments.
The temporal order of the gps points should be preserved in the routing.
The route is constrained by the road network graph topology (connections).
The route should obey the directed-ness of the segments, i.e., the edge directions of its graph topology.
The distance of the path traveled should not contradict the speed limit of the road segments and cumulative timestamps.

To this end, above points are studied by various map matching approaches devised from simple snapping to the nearest segments to the weighted averages of more sophisticated metrics. Most of these geometrical ideas often result in nonuniform level of success due to their reliance on sampling frequency and gps accuracy.

The procedure to solve this optimization problem should take into account the state of the gps points in a range, i.e., if we are to figure out the projection of a gps point onto a prospective set of segments at time $t_n$, the decision should not contradict for the next set of gps points at $t_n$+k where k is the range or the width of the window that we 'look ahead' to correct the predicted snap location at the current $t_n$, station under the criteria and constraints listed above. The best solving strategy for this kind of optimization problem is the application of Hidden Markov Chains (MC) concept where at each gps station there is a probability computed from the transitional probabilities of the +k ('ahead') states of the gps points; in other words, the current state probability depends on the future possibilities.

This is how the Markov Chains (MC) is generally formulated for a map matching (MM) problem: the hidden state is the likelihood (probability) of a gps point to be snapped on a prospective edge segment. In other words, the probability of a point to be snapped over a prospective edge segment is hidden by the probabilities of the next set of gps samples. These transitional probabilities could be modeled either as how close the gps point to a possible set of nearby edges or the cumulative cost of traveling from one prospective location to the next or both. To this end, there have been many MM algorithms tried in the literature using different approaches from totally topological to geometric and probabilistic.

Figure 1:
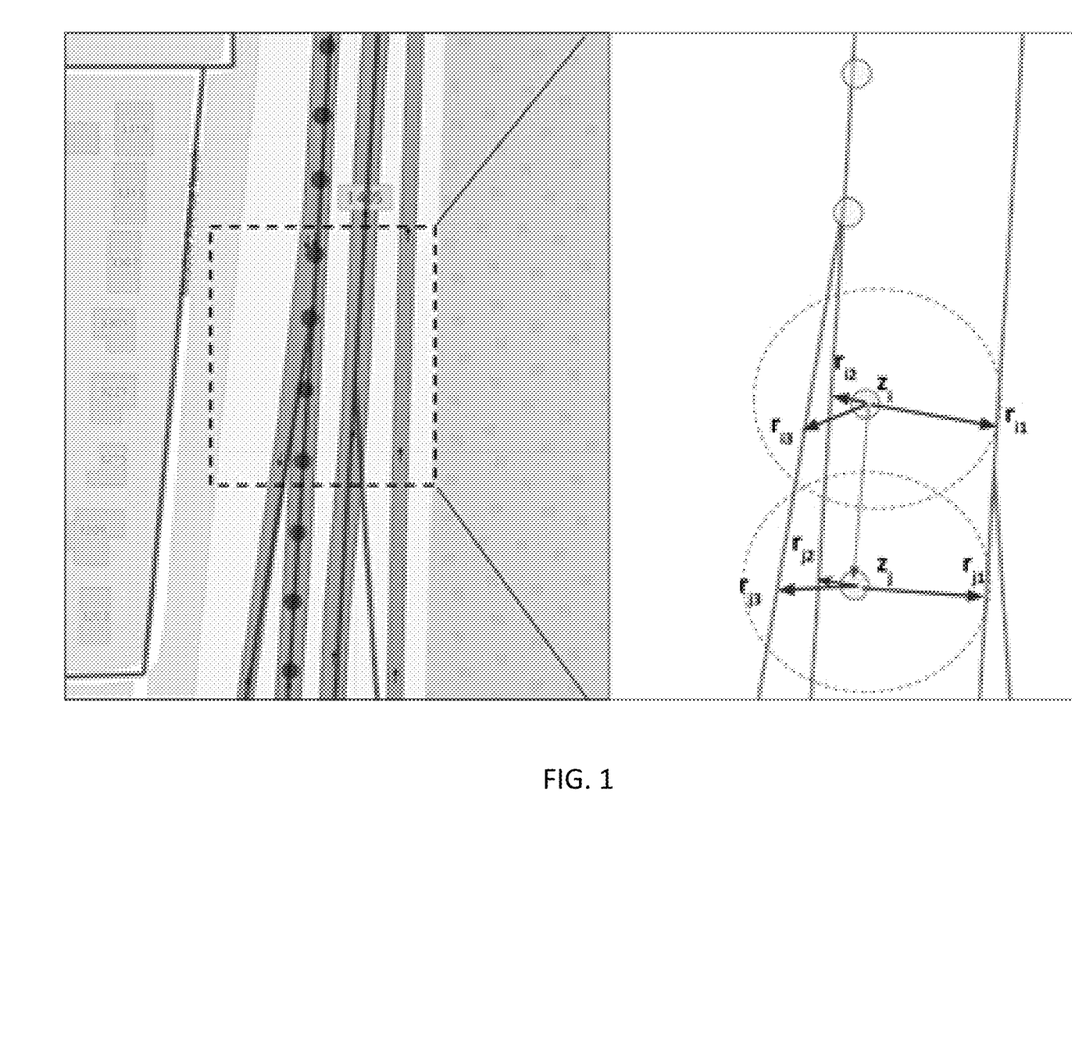
FIG. 1 illustrates gps samples along a graph road network.

Map matching utilizing Markov chains exercise the geodesic distance between the consecutive gps samples, $Z_i$ and $Z_i$+1 as being the base factor in determining the transitional probabilities in the hidden Markov chain (HMC) kernel. The deviation between this base distance and the route distance from road segment projections, ri to rj is defined as the raw transitional probability among all prospective snap projection combinations and depicted as $t_{ij}$ in Equation 1.(a-c). The distance error is then cast into an exponential probability distribution function shown in Equation 1.(d) with β being an ad-hoc error coefficient, prior to the HMC kernel iterations depicted as k in 1.(e-f). The parameter definitions of Equation 1 is also illustrated in FIG. 1. A sub-section of the samples where two consecutive gps sample pairs and their respective parameters used in Equation 1 is shown. The parameters $r_i$ and r are one of the three prospective snap locations for gps samples $z_i$ and $z_j$, respectively, found within the search radius of the R-tree shown within the dotted circles.

It is also worth noting the number of prospective snap locations (maximum of three, as yet another parameter) is only found within a pre-set radius of the R-tree per gps sample shown with the dotted circles on FIG. 1. They have also noted that there can still be problems particularly for the noisy data near intersections even though HMC kernel superiorly predicts the ground truth with greater accuracy and not sensitive to the sampling frequency.

$$p_i = P(z_i | r_i) \quad (1a)$$

$$t_{ij} = p_i \longmapsto p_j \quad (1b)$$

$$t_{ij} = |\|z_i - z_j\|_{geodesic} - \|r_i - r_j\|| \quad (1c)$$

$$t_{ij} \leftarrow (1/\beta) e^{-t_{ij}/\beta} \quad (1d)$$

$$p_i^{k+1} = t_{ij} \cdot p_j^k \quad (1e)$$

$$p_i^{k+1} = t_{ij}^k \cdot p_j^o \quad (1f)$$

Given this set of constraints, there is need for improved map matching techniques utilizing Markov chains.

SUMMARY OF THE INVENTION

A non-transitory computer readable storage medium has instructions executed by a processor to adaptively increase Markov chain kernel window width while processing global positioning system (gps) samples as a function of the ratio between geodesic distances of a current route to an actual geodesic distance between pairs of gps samples. The total cost of different kernel sequences is found based on an aggregated sum of shortest path runs through graph edges within different kernel sequences. Road weights are modified based on relative distance of prospective snap locations of road segments to the gps points, so that the shortest path runs with respect to all possible snap locations are selected. Selected kernel sequences are presented as a proposed mapped vehicle route.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Markov chains have frequently been applied to match the probable routes with a set of gps trip data that a pilot vehicle is emitting over a specific graph road network. This class of map matching (MM) algorithms presently demonstrate and involve statistical and ad-hoc measures to drive the Markov chain transitional probabilities in picking the best route combinations constrained over the graph road network. Disclosed herein is an adaptive scheme to modify the Markov chain (MC) kernel window as we move along the gps samples to reduce the mistakes that can happen by the use of narrower MC widths. The measure for temporarily increasing the MC window width is chosen to be the ratio between the geodesic distance of current route to the actual geodesic distance between each pair of gps samples. This adaptive use of MC has shown to have hardened the results significantly with tolerable computational cost increase. The details of the overall algorithm are depicted by the example routes extracted from various vehicle trips and the results are shown to validate the usefulness of the algorithm in practice.

The disclosed algorithm makes a major contribution in detecting the problem areas and adaptively applying wider HMC kernel widths where necessary to fix the remaining issues. The kernel width is then reset back to the shorter span for efficiency. The other major differentiating factor is that our process finds the total cost of the overall kernel sequence based on the aggregated sum of the mini Dijkstra runs within each pair of a sequence. Road weights are modified based on the relative distance of prospective snap locations of the road segments to the gps points, so that the shortest path runs for all possible snaps are selected. Road constraints are applied as filters on the combination sequence generations before running mini-dijkstras on the probable paths. The overall algorithm is explained in the next section, followed by its application on user test cases with varying sample frequencies and trip durations.

The input to the MM algorithm is a set of time-stamped longitude-latitude (lon-lat) pairs of gps data and a road network graph. The road network graph G(V, E) is generated enclosing the entire set of GPS samples and a range tree (R-Tree) is constructed from the line segments of the edges of the graph. A set of closest edge segments is then searched and cached for each gps sample using the R-Tree. The number of prospective edges per gps sample is a parameter of the algorithm and a default value of up-to three distinct edge segments is used within a search radius of 10 times the graph tolerance—the graph tolerance is usually chosen to be between 1-10 meters with a corresponding lon-lat angle tolerance of roughly $10^{-5}10^{-4}$, respectively. The gps samples are optionally filtered to remove noisy data due to redundant recordings at stop signs and intersections. A Gaussian filter of 5 meter radius is used to filter out the noisy data. This rough filtering helps reducing the computational workload in some cases by 20-30%.

Figure 2:
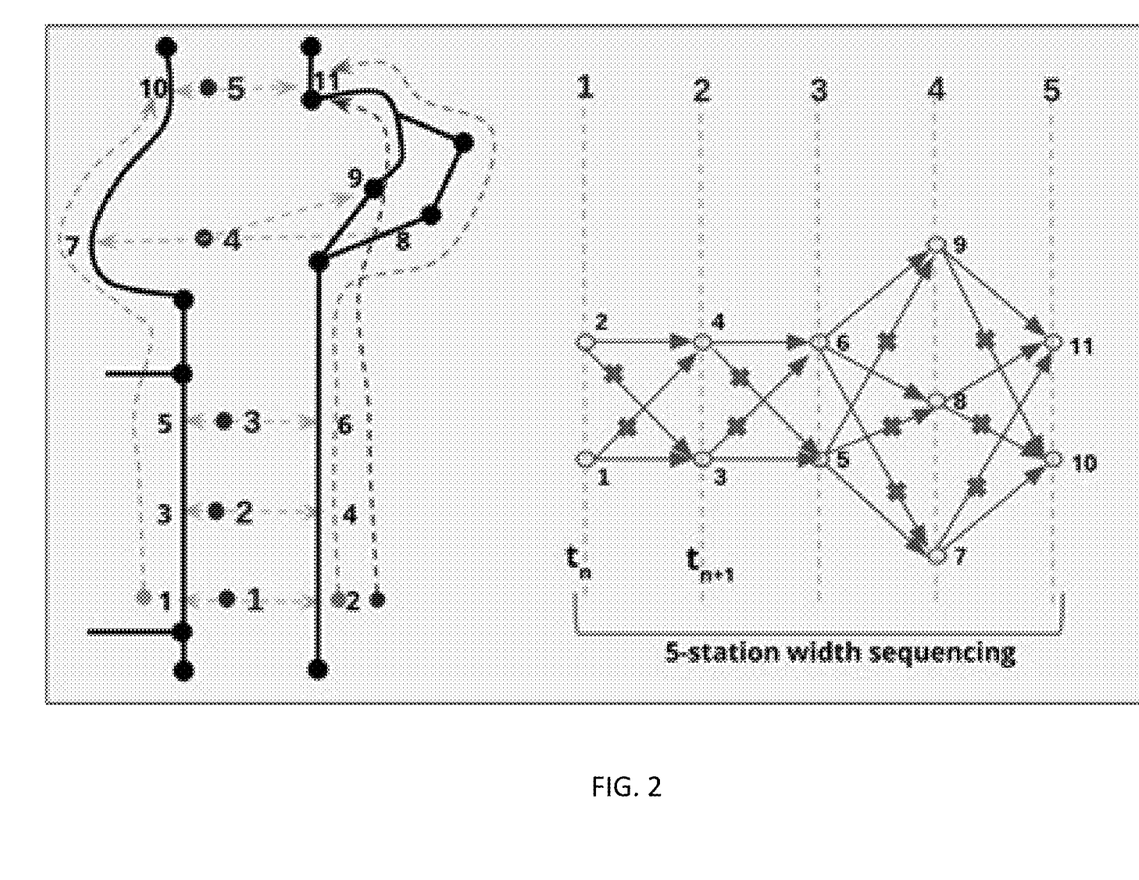
FIG. 2 illustrates network graph segments and possible snap locations.

The algorithmic steps will be explained by the help of a small road graph segment with five gps samples in its vicinity as shown in FIG. 2. In FIG. 2, dots from 1 to 5 are gps sample points. Black lines are the actual road network graph segments and the possible snap locations for each gps point are also depicted from 1 to 10; e.g., GPS sample 4 has three possible nearest segment projections, depicted as 7, 8, 9. Conceptual network transition diagram across gps sample stations is shown in vertical lines. At each gps sample location, there is a number of potential prospective snap locations; e.g., at sample 4, the gps point could be projected to segment locations 7, 8, 9. The constraints are shown as crosses; e.g., the path from 8 to 10 should not be allowed since there is no graph connections possible between the two.

There is a number of combinatorial sequences emerging based on all the possibilities of snap locations at each gps station. The task of finding the probability value of a specific pair (probability of a state) depends on the transitioning probabilities within the pairs in the sequence. The number of digits in a sequence equals the width of the gps sample stations in HMC; e.g., there are five digits of the sequence of the case depicted in FIG. 2.

Figure 3:
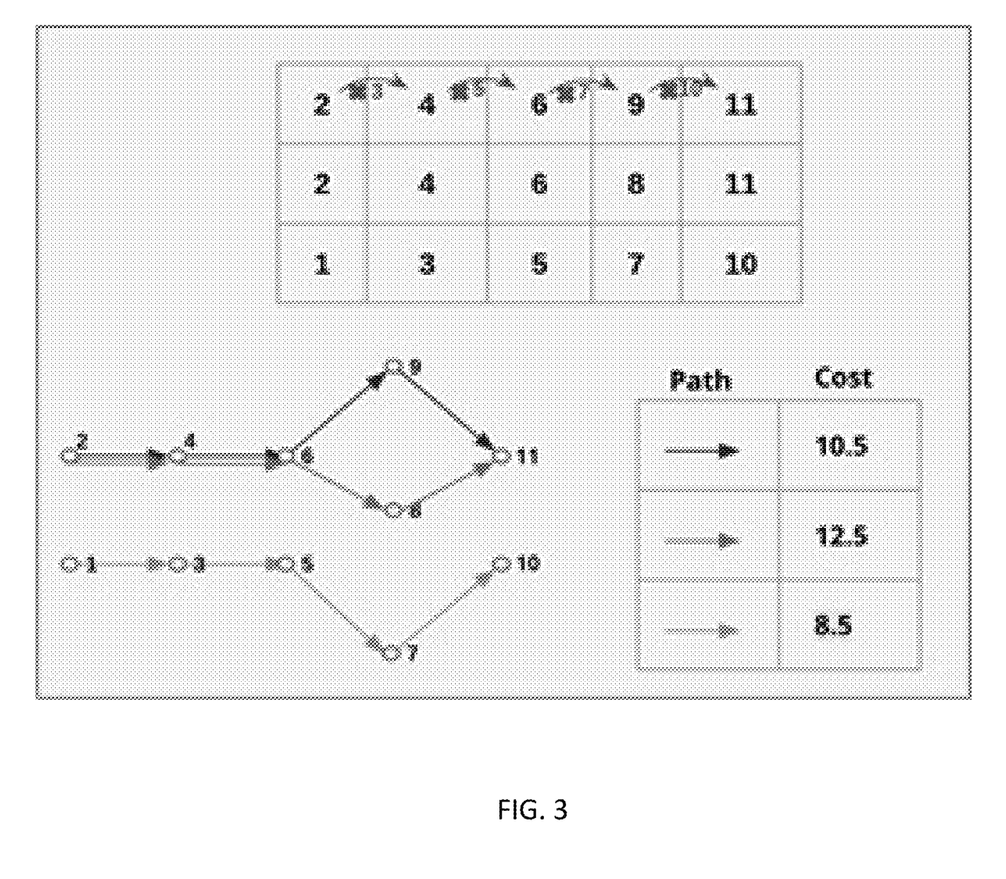
FIG. 3 illustrates minimum cost sequence computations.

Mathematically speaking, these probabilities are lumped as a sequence and each sequence has a cost value based on the sum of the shortest path runs aggregated over each pair. FIG. 3 shows finding the minimum cost sequence for the possible sequences in five digit combinatorials of snap locations numbered consecutively across gps samples. The sequence generation algorithm prunes the possibilities based on the topological connections; number 2 at the first station transitioning to the number 3 at the second station is not allowed and filtered from the sequence as depicted with the crosses. Three probable path sequences are shown in FIG. 3, as is the cumulative cost of mini-dijkstra runs aggregated between the pairs of each sequence; minimum cost sequence is 1–3–5–7–10 with the cost of 8.5.

However, shortest path favors the minimum accumulated weight of the edges in the path, and not necessarily those that the gps points are projected. Hence, the weights are modified proportionally for the nearest segments to the gps points so that the dijkstra algorithm implicitly embeds the snapping possibilities and solves for the minimum aggregated sum of the shortest path costs between each pair of the sequence. The modified weights are then reset to their original values when the whole width is shifted by one station to the next batch of width range. The entire algorithm is depicted in the pseudo-code form in the Main Algorithm below.

| Algorithms 1 Main Algorithm |
|---|
| 1:  procedure SOLVE(gps, trip, G(V,E), weights, width |
| 2:      adapated ← false |
| 3:      original ← width |
| 4:      for l ← 0 to gps.size() do |
| 5:          if adapted then |
| 6:              width ← adjustWidth(width) |
| 7:              adopted ← false |
| 8:          else |
| 9:              width ← resetWidth(original) |
| 10:         end if |
| 11:         n ← 0                                    Adapt Width |
| 12:         filtered ← 0 |
| 13:         while n < width do |
| 14:             m ← n + 1 |
| 15:             groDist ← geodense(gps, i, n, m) |
| 16:             weights ← adjustWeights(gps, i, n) (only for edges closest to point nl) |
| 17:             weights ← adjustWeights(gps, i, rn) |
| 18:             for j ← 0 to closestEdges(gps, i, n) do |
| 19:                 start ← snap(closestEdge(gps, i, n, j)) |
| 20:                 for k ← 0 to closestEdges(gps, i, m) do |
| 21:                     end ← snap(closestEdge(gsp, i, m, k)) |
| 22:                     cost ← costOptimizer(G, start, end, weights) |
| 23:                     if cost > maxCost then |
| 24:                         Filtered ← pair(j.k) |
| 25:                     else |
| 26:                         pathSegments ← register(start, end, cost, geoDist) |
| 27:                     end if |
| 28:                 end for(k) |
| 29:             end for(j) |
| 30:             weights ← resetWeights() |
| 31:             n ← m                                    Solve Kernel |
| 32:         end while |

```
Algorithms 1 Main Algorithm
33:      sequence ← generaveSequences(i, width, filtered)
34:      minCost ← maxFloatCost
35:      for sequence in sequence do
36:         sequenceCost ←0
37:         for path in sequence.pairs() do
38:            pathSegment ← pathSegments(parth first.path.second)
39:            sequenceCost ← sequenceCost + pathSegment.cost
40:         end for
41:         if sequenceCost < minCost then
42:            minSequence ← sequence
43:            minCost ← sequenceCost
44:         end if                                    Sequencing
45:      end for{sequence}
46:      if minSequence resists then
47:         path ← minSequence.path()
48:         pathDistance ← path.computeDistance(path[0],path[1])
49:         if (!adapted and pathDistance/path.geoDistance > maxDesicRatio)
50:            adapted ← true
51:            l ←l ←l
52:         else
53:            trip ← trip + path          Side Kernel Feedback
54:         end if
55:      end if
56:   end for[l of gps]
57: end procedure
```

Figure 4:
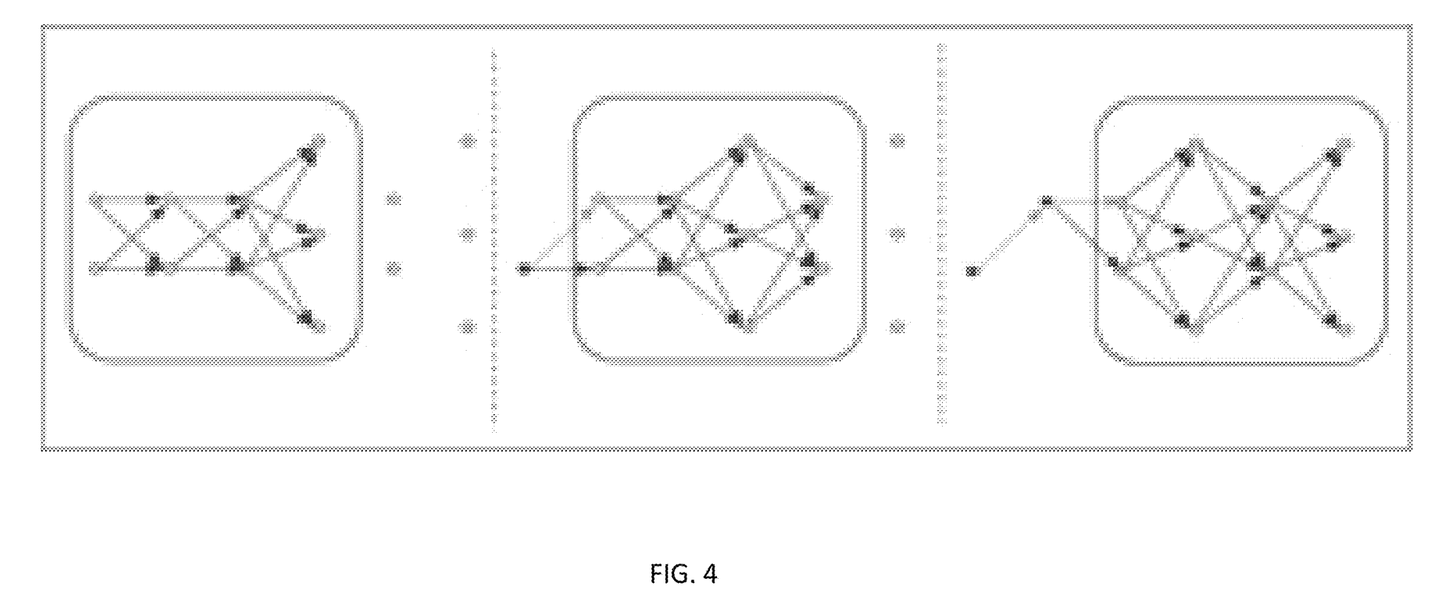
FIG. 4 illustrates sliding the kernel by one station.

This main algorithm is divided into four sections, namely, adapting the width, solving the HM kernel, sequencing and applying filters and finally detecting the errors for readapting the width before sliding the kernel by one station to the next range as shown in FIG. 4.

Figure 5:
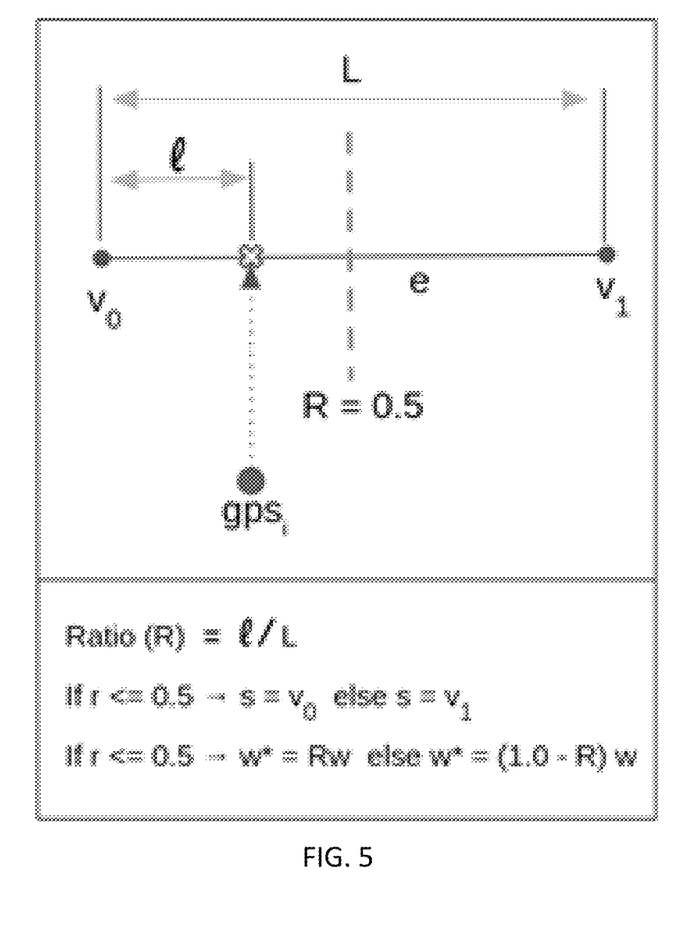
FIG. 5 illustrates projection of a gps point on a prospective edge.

A Dijkstra shortest path solver is implemented to run between each pairs of a sequence. The efficiency in the minimal way of storage and processing speed is very crucial in the overall performance of the MM algorithm, as these mini solves are running thousands of times during the course of the algorithm execution. The start and end locations could be snapping over the same graph edge in which case, the dijkstra cost optimizer would reduce to the arithmetic operations of finding the proportional weights based on the projection locations along the edge. In fact, there are quite a number of possibilities of how the cost is calculated based on the projection locations of the pair's start and end locations, as shown in FIG. 5. FIG. 5 shows projection of a gps point gps, on a prospective edge e–. The weight w is adjusted as w* based on the snap location 1 away from $v_o$ and s is also chosen based on the snap ratio R as the start graph node for the cost optimization solve.

The weights on the prospective snap segments are modified to make sure that the cost optimization solver has a proportional and ensured bias on the close segments to the gps points. MM routing cases are found to be not particularly sensitive to the weight modification heuristics. For the cases tested within our work, we have found out that one tenth of the original weight is adequate in forcing the solves to follow the gps samples. Another crucial observation is that the Markov characteristics of the algorithm seems to be relaxing the sensitivity on the ad-hoc nature of the weight factor selection schemes.

In general, the dijkstra condition (DC) on each vertex $v_i vi$ can be specified by Equation 2

$$d_i(d_j + w_{ij}) \mid w_{ij} : v_j \xrightarrow{\hspace{0.3cm}} v_i \in N(v_i) \quad (2)$$

-continued $$\mathcal{D}_{start,end} = \min_{v_i \in G(V,E) \mid_{start}^{end}} (d_i)$$

which states that the cost $d_i$ cannot be greater than the minimum of the cost of any incoming vertices connected to via the edge's weight $w_{ij}$. The DC condition is satisfied in a breadth first search manner by the dijkstra-$\mathcal{D}$ kernel originated from the source (start) node and terminated at the destination (end) node. We opt for using a priority queue implementation for the dijkstra solver which seems to supersede parallel implementations in speed due to its small sub-graph size between the start and the end nodes; in MM case, pairwise gps time-stamps are at most 200 meters away, i.e., only a few hundred edges needed for traversals at the most.

The essential juxtapose of the algorithm pivots around the ability of generating the sequences under the topological constraints of the road network. The latter is applied as filters in the sequence generation engine. The filtered pairs are identified by the failure of the cost optimization solver. The sequences are generated after the exhaustive solve cycle so that the filtered pairs could be applied simply as constraints on the combinatorial number sequence generation scheme (See FIG. 3). The cost between each pair of indices found by the solver in each sequence is aggregated and the total cost is paired with the sequence number as depicted in Equation 3.

$$cost_k : \mathcal{C}_k = \left\{ \sum_{i=0}^{width-1} \|\mathcal{D}_{i,i+1}\| \right\}_k \quad (3)$$

$s_0 = \{2, 4, 6, 9, 11\} : \mathcal{C}_0 = 10.5$ $s_1 = \{2, 4, 6, 8, 11\} : \mathcal{C}_1 = 12.5$ $s_2 = \{1, 3, 5, 7, 10\} : \mathcal{C}_2 = 8.50$ $$\operatorname{argmin}(s_k, \mathcal{C}_{i_k}) \mapsto \{s_2, \mathcal{C}_{i_2}\} \quad (4)$$

The optimization problem is then reduced to picking the minimum total cost sequence among all probable sequences. When the minimum cost sequence is picked as shown in the example as the second sequence with the cost of $C_2C2=8.50$, only the first point in the sequence is set for the sure-match and the kernel is shifted to the right (next time-stamp station), thereby the decision for the current sample's snap location (state) is always made based on the probability states of the gps sample stations in the next range whose width is not constant. So, the sequence s2 is picked and the first gps sample location in the sequence is fixed at the snap location corresponding to the index {1} as depicted in Equations 3 and 4.

Figure 6:
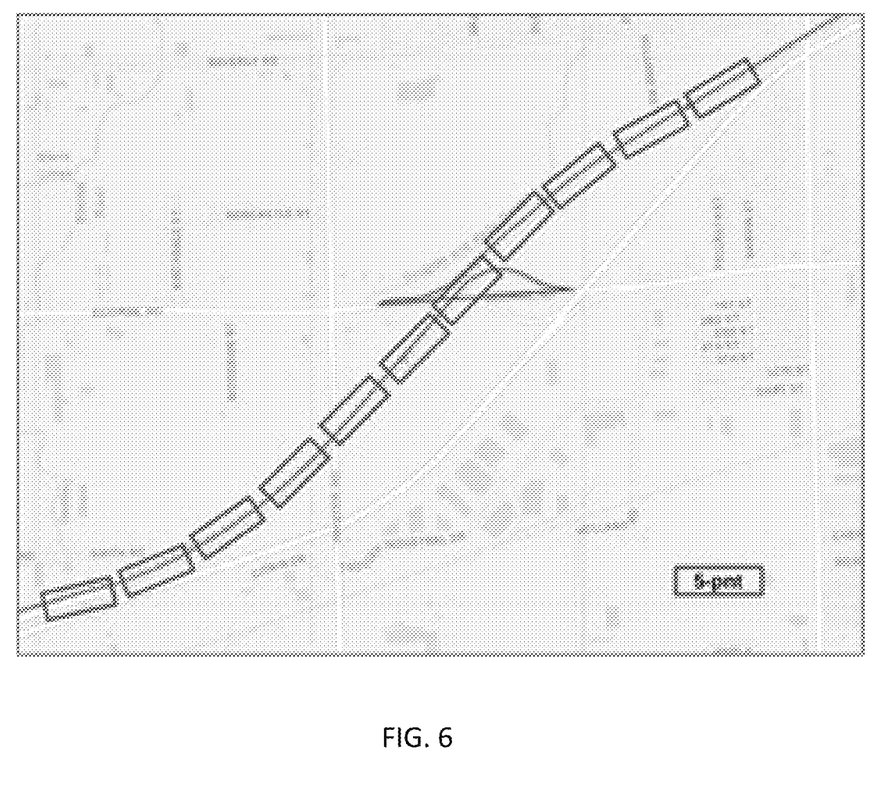
FIG. 6 illustrates map matching results using fixed width MC kernels.
Figure 7:
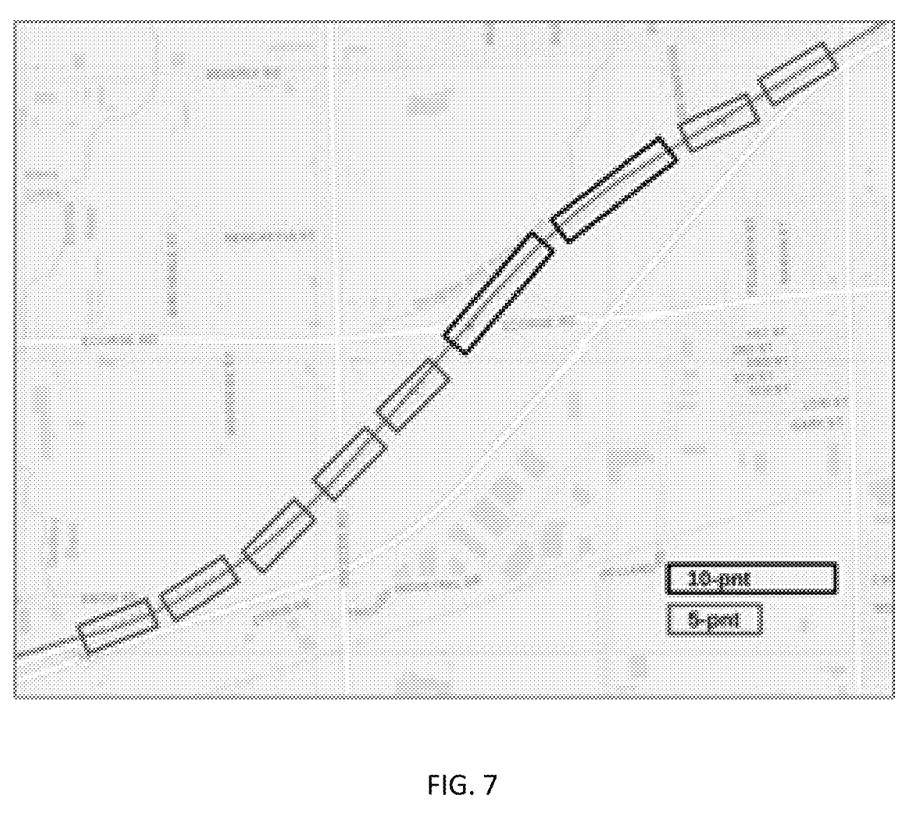
FIG. 7 illustrates map matching results using adaptive width MC kernels.

The decision of adapting the MC window width is based on the ratio between the geodesic distance of the route (snaps) to the actual geodesic distance of the gps points (samples). However, instead of the difference depicted in Equation 1c, we have used the ratio of the distances to detect the errors in the map matching process. The need for increasing the kernel width can easily be noticed in the mid-section of a typical example case shown in FIG. 6 as the ratio of the geodesic distances exceeds an ad-hoc threshold limit of ten (×10). Basically, the kernel's width was not wide enough to include the future history that would anticipate favoring on a more logical (sensical) map matching. Hence the redundant looping around the intersection is avoided with the help of including more points inside the MC kernel as seen in FIG. 7 (10 points versus 5). The adaptation scheme of doubling the width has a maximal ceiling of fourteen points and will not re-try once this ceiling is reached as the number of probable sequences quickly becomes formidable to enumerate and solve.

The adaptive selection of the width in the MC kernel has shown to have hardened the results tremendously with tolerable computational cost increase since the feedback loop depicted in the main Algorithm reverts back onto the original and narrower width of MM right after running the wider kernel scenario. From the computational experiments, it could also be speculated that the likelihood of making an erroneous decision with a narrower span is not uncommon particularly for the cases where the sampling frequency is not adequate and/or more valid sequences exist.

Figure 8:
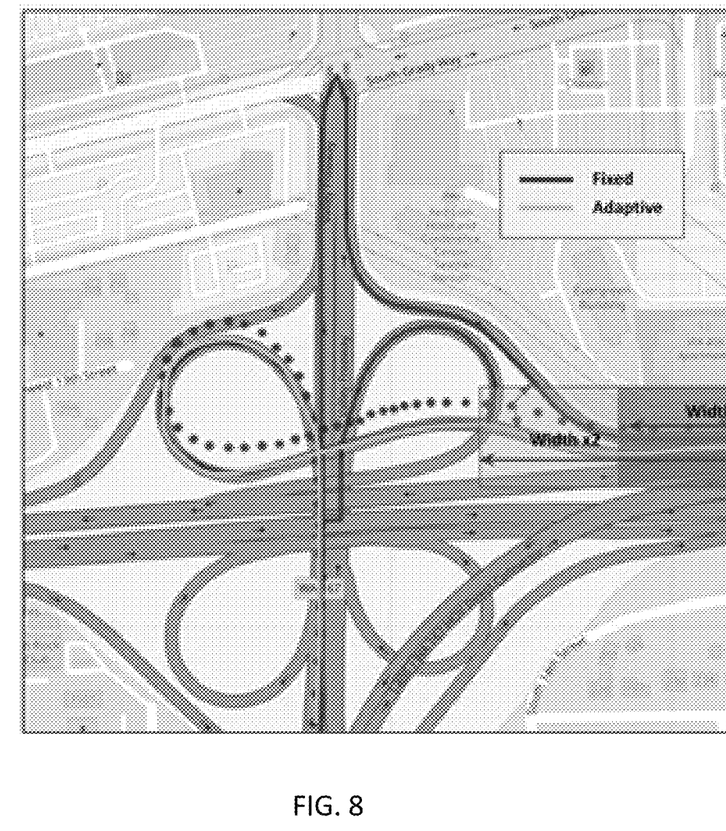
FIG. 8 illustrates fixed width MC kernel results versus adaptive width MC kernel results.

Another example for the adaptive kernel solving the wrong path selection issue due to the erroneous gps samples (latitude shift) can also be seen in FIG. 8, where the result of our adaptive scheme is compared against the fixed width algorithms. In FIG. 8, the dots denote the input gps samples that are erroneous due to a random latitude shift. The fixed width algorithms result in dark graph path, with redundant loops indicative of faulty map match. The adaptive switch of the kernel width twice more than the fixed width enabled HMG algorithm to include the key gps sample to change the overall route to a more correct alternative as depicted on the right.

Adaptively switching the width twice more than the nominal value helped including the 'key' gps samples whose projection snaps are over the correct graph road segment. The automatic switch from fixed width to adaptive width is detected by computing the ratio between the geodesic and the route distances within any consecutive pairs of gps samples during the 'Slide Kernel Feedback' step of the main algorithm.

We have used thousands of sets of gps trip data, emitted from the test vehicles across the continental US to verify and harden the results of our algorithm. In fact, the remedying idea of adapting the Markov chain width directly came from analyzing these valuable sets of data and seeing where the problem areas arise. The observed cases where we have noticed a potential adaptation needed can be itemized as follows:

Approaching to the forking road segments where gps samples are actually closer to the wrong section of the fork is resolved to a 'correct' path only by 'looking ahead' towards the next set of points.

The noise in the gps data is making many choices viable and only having a cumulative score of combinatorial path optimization leads to a reasonably correct' path.

The upper and lower passes of the road network where the z-level changes may have overlapping two dimensional (lon,lat) coordinates and hence graph edges built without hashing on z-level values, can be connected from lower to upper sections. The resolution may both need to have the graph to be z-aware and also use wider Markov chains in map matching.

The round-about sections require wider kernel widths in order to identity the paths correctly.

All of the above observations show the need for a Markov chain type optimization to be employed and also reflects the need to change the kernel width adaptively to resolve the paths correctly.

The sequences generated via Markov chains uses many mini-dijkstra runs as explained above. However, if the gps points are too far away from each other, particularly the case for the inability to emit the data inside tunnels, etc., the dijkstra runs should be allowed to cover more than the distance between the two gps end points. In order to minimize the computational load, however, if the dijkstra run cannot reach the 'end' node from the start within a user set limit, e.g., within 10 hops, then the sequence is deemed to be not valid, and skipped by leaving gaps in the matched route.

There are also rare scenarios due to numerical instability induced by the modifications of the edge weights proportional to the proximity of the graph edges to the gps samples, that can result in sequences that might have redundant back and forth traveling over the same edge. These are referred as folding vertex paths and should be filtered out before finding the minimum cost sequence depicted by Equation 3. Filtering out these paths require additional computational time, and even though the individual check is not expensive, the need to repeat the check for shifting kernels cannot be amortized easily. Hence, filtering is made optional, as a typical trade-off between accuracy and speed. The additional time is proportional to the kernel width, the total number of gps points, as well as the number of prospective snap edges per gps point found by the R-Tree search. It can vary from low 1-2% to almost as high as 30% for the rare cases of 10+ hour long trip durations with 2-5 seconds gps frequencies. For example, the folding vertex paths, such as the sequence as, {2, 2, 2, 2, 2, 2, 3, 3, 4, 4, 4, 3, 5, 5, 6, 7, 7}, can easily be identified due to its redundant { . . . 3, 4, 4, 4, 3 . . . } fold pattern.

An ad-hoc matching score per trip is computed to understand how well the mapped route is matching with the underlying gps points. The gps points are snapped back onto the map matched route and the distance difference between the gps location to its closest snap location is aggregated over the whole set and divided by the total number of gps sample points. In lieu of the ground truth data which is unfortunately not available for our tests, this heuristic measure at least gives a notion for an error of the match similar to a mean squared residuals over the entire data set. Almost all good matches demonstrate a match score well within 1-5 meters (1 meter$\approx 10^{-5}$ in degrees). Any match score higher than this threshold range indicates that either the samples are highly noisy and/or the order in the gps timestamps are erroneous.

Finally, the performance of our algorithm can be said to be dependent on a number of parameters; total number of gps points, the input parameter of initial Markov chain width (the adaptive kernel never goes below this preset value), the number of closest edges per gps point found by the R-Tree. This latter parameter and the chain width directly impacts the total number of combinatorial sequences and consequently the number of mini-dijkstra runs. Our algorithm allows users to trade accuracy versus speed. However, it is rare that we have seen a map matching process taking more than a few seconds on modern laptops (2-3 GHz intel i7 processors). Another limiting parameter we have instrumented is the cap on the number of combinatorial sequences generated, currently, at 10,000 that gets generated within each kernel shift that is usually never violated with the common widths of 6-9 points and 3-4 closest number of edges per gps sample.

Adaptive versus Fixed width Results

| Width (base) | Method | Time (second) | AvgErr (meter) | MaxErr (meter) |
|---|---|---|---|---|
| 5 | Fixed | 5.23 | 11.6 | 152.7 |
|  | Adapt | 9.54 | 1.9 | 5.5 |
| 8 | Fixed | 17 | 6.8 | 152.7 |
|  | Adapt | 25 | 1.1 | 1.3 |
| 10 | Fixed | 53.7 | 2.9 | 152.7 |
| 14 | Fixed | 453.6 | 0.9 | 1.3 |

Table 1 includes 140K gps samples of 77 trips with varying frequencies computed over a graph of 475K edges, and a maximum of 3 closest snaps per gps sample within a search radius of 10 meters. The table lists mean and maximal errors found in these trips for various base widths to compare the fixed width algorithms against our adaptive method. Mean squared residuals over all trips are tabulated over the 'AvgErr' column and the maximum error found in any trip depicted as the 'MaxErr' column, respectively. One major noteworthy remark on these results is that there appears to be one trip case that has a wrong map match causing over hundred meter error and none of the fixed widths up to 14 points could address the trip's map successfully (within an admissible error bound). However, the fixed HMC width of 14 takes almost exponentially large run time increase compared to the lower widths, that makes the entire map matching process computationally prohibitive. The solution is the use of our adaptive algorithm and as depicted over Table 1, even the use of only 5 (five) points adaptively was seemingly able to switch to the necessary width where necessary to resolve the erroneous path matching issue. The optimal choice seems to be the use of base width of 8 adaptively to suppress both the maximal and average errors. Both 8 and 5 point adaptive results show orders of magnitude speed gains compared to the fixed width conventional HMC algorithms.

Though the entire algorithm is not particularly suitable for parallelization, we have parallelized the batch runs of many trips as well as registering the mini-dijkstra runs within each solve. On one test batch consisted of more than 300K sample points belonging to 370 individual trips of varying degrees of sampling frequencies between 0.5 seconds to 5 seconds, we were able to obtain results in less than 24 seconds using 8 cores where 95 percent of the trips had match scores well below 1 meter over a graph of approximately 7 million edges. Though these results are satisfactory in practice and the algorithm has been adopted by our industry partner car company, parallel batch runs cannot be proven to provide linear at-scale performances. One of the reasons of bottle-necking the overall scalability is due to the 'heavier' sets of trips with more gps samples that might also require more adaptive cycles. In the future, we are planning to improve the scalability of the algorithm by addressing parallelism within each individual modules in the core algorithm.

Finally, the novel idea of using the adaptive markov kernel width proposed as the main contribution of our paper could easily be adopted and plugged into the existing map matching algorithms to improve the general accuracy of the results.

It is also worth mentioning about the nature of the software in this algorithmic work, that is entirely implemented from scratch using C++, and without the use of any third party libraries. The I/O to the map matching algorithm is provided from the in-memory database of Kinetica, a GPU streaming data warehouse and using its propriety C++ APIs. The map matching is itself a yet another Kinetica API, and available in RESTFUL/C++/Java/R/Python API formats.

Figure 9:
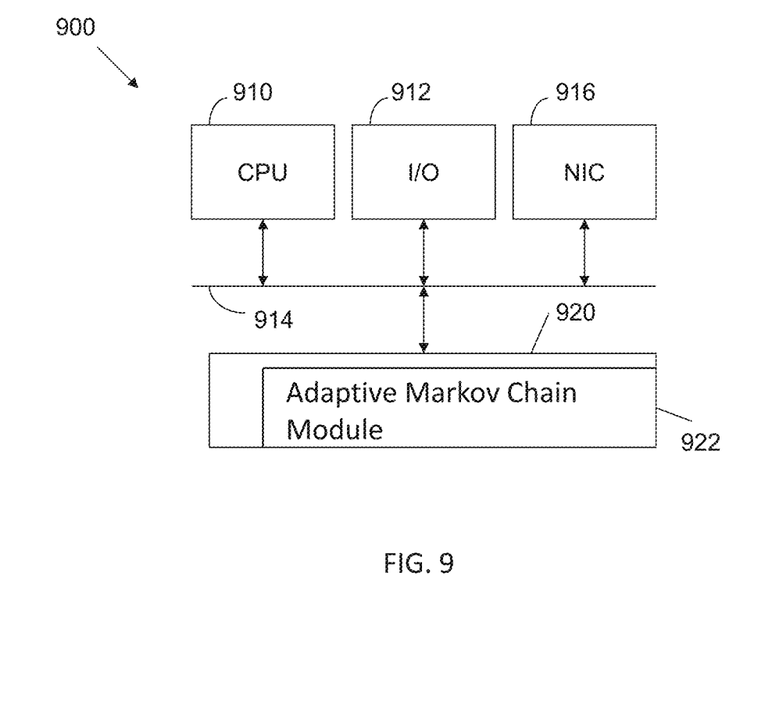
FIG. 9 illustrates a machine configured in accordance with an embodiment of the invention.

FIG. 9 illustrates a machine 900 configured to implement the disclosed processing operations. A processor 910 is connected to input/output devices 912 via a bus 914. A network interface circuit 916 is also connected to the bus 914 to provide connectivity to a network (not shown). A memory 920 is also connected to the bus 914. The memory 920 stores an adaptive Markov chain module 922 with instructions executed by processor 910 to implement the processing operations disclosed herein.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by a processor to:
   adaptively increase Markov chain kernel window width while processing global positioning system (gps) samples as a function of the ratio between geodesic distances of a current route to an actual geodesic distance between pairs of gps samples;
   find the total cost of different kernel sequences based on an aggregated sum of shortest path runs through graph edges within different kernel sequences, wherein road weights are modified based on relative distance of prospective snap locations of road segments to the gps points, so that the shortest path runs with respect to all possible snap locations are selected; and
   present selected kernel sequences as a proposed mapped vehicle route.

2. The non-transitory computer readable storage medium of claim 1 further comprising instructions executed by the processor to apply road constraints as filters on the different kernel sequences.

3. The non-transitory computer readable storage medium of claim 1 further comprising instructions executed by the processor to remove noisy data from the gps samples.

4. The non-transitory computer readable storage medium of claim 1 further comprising instructions executed by the processor to apply a Gaussian filter to remove noisy data from the gps samples.

5. The non-transitory computer readable storage medium of claim 1 further comprising instructions executed by the processor to filter folding vertex paths in the gps samples.

* * * * *